United States Patent [19]

Rathbun et al.

[11] 4,320,465
[45] Mar. 16, 1982

[54] DIGITAL FREQUENCY MODULATION AND MODIFIED FREQUENCY MODULATION READ RECOVERY WITH DATA SEPARATION

[75] Inventors: Donald J. Rathbun, Andover; David B. O'Keefe, Westford, both of Mass.

[73] Assignee: Honeywell Information Systems Inc., Waltham, Mass.

[21] Appl. No.: 38,767

[22] Filed: May 14, 1979

[51] Int. Cl.³ .................. G11B 5/09; G06F 13/04
[52] U.S. Cl. ......................... 364/900; 360/39
[58] Field of Search ... 364/900 MS File, 200 MS File; 328/63, 109, 120; 307/208, 232, 233 R; 360/45, 39, 40

[56] References Cited

U.S. PATENT DOCUMENTS

| | | | |
|---|---|---|---|
| 3,108,261 | 10/1963 | Miller | 360/44 X |
| 4,000,513 | 12/1976 | Precourt | 360/45 |
| 4,034,348 | 7/1977 | Rathbun | 364/900 |
| 4,040,022 | 8/1977 | Takii | 364/900 |
| 4,173,027 | 10/1979 | Rathbun | 360/45 |
| 4,212,038 | 7/1980 | Rathbun | 360/41 |

*Primary Examiner*—Gareth D. Shaw
*Assistant Examiner*—Thomas M. Heckler
*Attorney, Agent, or Firm*—George Grayson; Nicholas Prasinos

[57] ABSTRACT

Digital data is recorded on the surface of a magnetic media such as a disk or diskette in the form of magnetic flux transitions identifying clock and data information in either a frequency modulation (FM) mode or a modified frequency modulation (MFM) mode. A read head senses the flux transitions which are in turn converted to digital signals. Apparatus converts the time between successive digital signals into PROM addresses. The PROM address locations store coded signals identifying the data as binary ONE or binary ZERO signals.

6 Claims, 7 Drawing Figures

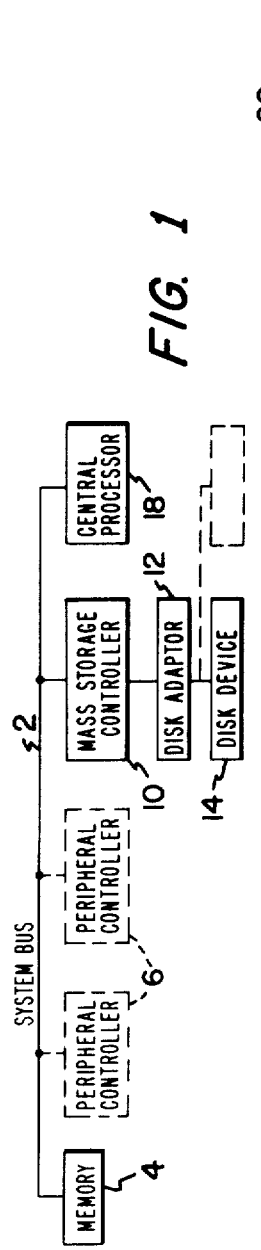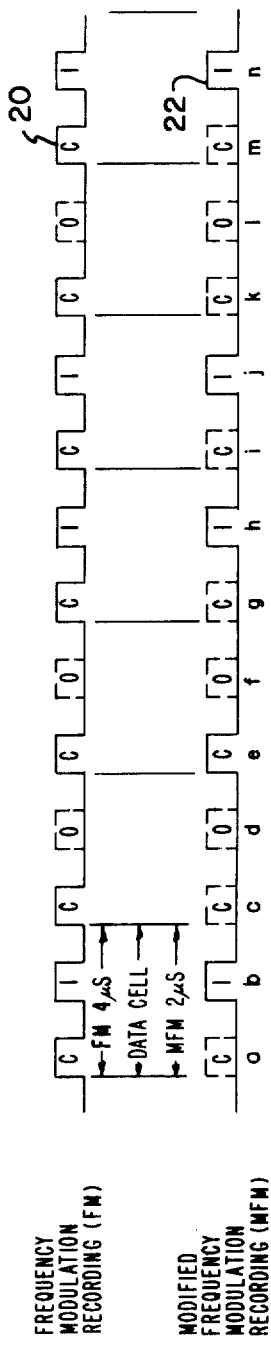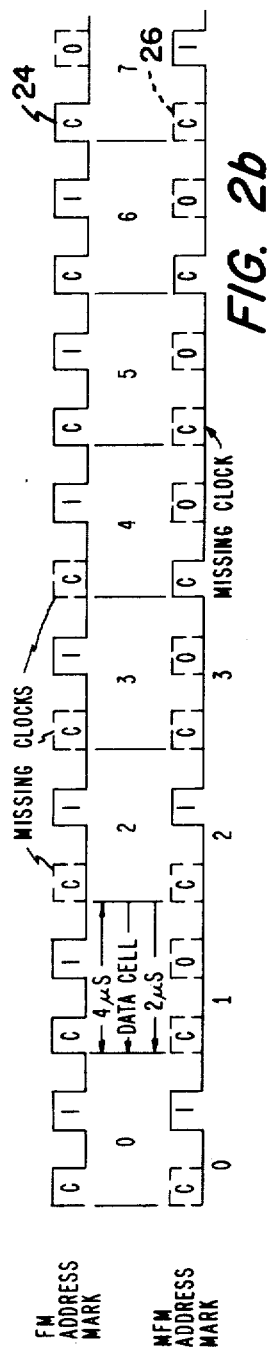
FIG. 1
FIG. 2a
FIG. 2b

CONTENTS OF PROM 64-ADDRESS LOCATIONS

| ADDRESS LOCATIONS (MFM) (DECIMAL) | | PRMBXX+00 XX | | | |
|---|---|---|---|---|---|
| | | 04 | 03 | 02 | 01 |
| 0- 46 | NOT USED | 0 | 0 | 0 | 0 |
| 47- 71 | 2 $\mu$ SEC LAST BIT CLOCK | 0 | 0 | 0 | 0 |
| 72- 94 | 3 $\mu$ SEC LAST BIT CLOCK | 0 | 0 | 1 | 1 |
| 95-122 | 4 $\mu$ SEC LAST BIT CLOCK | 1 | 1 | 0 | 0 |
| 123-173 | NOT USED | 0 | 0 | 0 | 0 |
| 174-199 | 2 $\mu$ SEC LAST BIT DATA | 0 | 0 | 1 | 1 |
| 200-222 | 3 $\mu$ SEC LAST BIT DATA | 1 | 0 | 0 | 0 |
| 223-250 | 4 $\mu$ SEC LAST BIT DATA | 1 | 0 | 1 | 0 |
| 251-255 | NOT USED | 0 | 0 | 0 | 0 |

*FIG. 5*

CONTENTS OF PROM 64-ADDRESS LOCATIONS

| ADDRESS LOCATIONS(FM)<br>(DECIMAL) | | PRMBXX+00 XX | | | |
|---|---|---|---|---|---|
| | | 04 | 03 | 02 | 01 |
| 256-339 | 2 µSEC<br>LAST BIT CLOCK | 0 | 0 | 1 | 1 |
| 340-378 | 4 µSEC<br>LAST BIT CLOCK | 0 | 0 | 0 | 0 |
| 379-467 | 2 µSEC<br>LAST BIT DATA | 1 | 0 | 0 | 0 |
| 468-519 | 4 µSEC<br>LAST BIT DATA | 1 | 1 | 1 | 0 |

DIGITAL FREQUENCY MODULATION AND MODIFIED FREQUENCY MODULATION READ RECOVERY WITH DATA SEPARATION

RELATED APPLICATIONS

The following U.S. patent applications filed on an even date with the instant application and assigned to the same assignee as the instant application are related to the instant application.

1. "Digital Read Recovery with Variable Frequency Compensation" by Donald J. Rathbun and David B. O'Keefe and having U.S. Ser. No. 038,977.

2. "Write Precompensation and Write Encoding for FM and MFM Recording" by Donald J. Rathbun and Peter P. Campbell having U.S. Ser. No. 039,054, now U.S. Pat. No. 4,245,263.

BACKGROUND OF THE INVENTION

1. Field of Use

The present invention relates generally to data processing systems and more specifically to the recovery of clock and data information written on magnetic media such as is coated on the surface of a disk or diskette.

2. Description of the Prior Art

The need for higher density recording of digital information on a magnetic medium has fostered the development of numerous encoding schemes including both phase and frequency encoding. With increased data processing speeds placing greater emphasis on high density magnetic recording, industry has resorted to frequency modulation (FM) and modified frequency modulation (MFM) binary information streams. The FM and MFM information streams are generally referred to as single density and double density encoded information, respectively.

U.S. Pat. No. 3,108,261 issued to Miller, entitled "Recording And/Or Reproducing System" describes a form of MFM recording using a considerable amount of circuitry.

FM or single density read recovery is disclosed in U.S. Pat. No. 4,034,348 to Rathbun, wherein feedback loops are used to generate timing strobes for detecting both clock and data bits. Further, MFM or double density encoding has been disclosed in a Control Data Corporation project note entitled "MFM Double Density FDD System" and dated Nov. 16, 1976. The insertion of an illegal logic zero clock signal in the address mark field to provide an address mark and the use of delay lines to accommodate a read recovery also are disclosed.

The read recovery systems in general have been comprised of frequency sensitive devices such as delay lines, variable frequency oscillators (VFOs), phase lock oscillators (PLOs) and feedback loops for generating timing strobes. The delay lines have exhibited a limited accuracy which is unacceptable in contemporary data processing systems. The VFO and PLO systems must be tuned to the rate at which information is to be received from a storage medium. When the VFO or PLO tuned frequency drifts or the system architecture is changed, a retuning is required to prevent read errors. The accuracy of VFO and PLO systems in addition is affected by the occurrence of write splices which may be present in the information stream as a result of an updating of data records on the storage medium. The delay lines, VFOs and PLOs further are not compatible with integrated circuit implementation. Those read recovery systems using the feedback loop method of generating timing strobes are the more complex of the prior art systems. Because of the complexity, feedback loops have been limited to FM read recovery systems.

U.S. Pat. No. 4,212,038 which issued July 8, 1980 and entitled "Double Density Read Recovery" is directed to a logic system for converting MFM encoded information to a non-return to Zero (NRZ) information stream without the use of delay lines, VFOs, PLOs or timing strobe feedback loops. Instead, logic ONE bits occurring in the information stream are applied serially through an input shift register. Outputs of the input shift register are sampled by a multiplexer in response to a control signal indicating the occurrence of clock bits in the MFM information stream. Timing strobes for controlling the operation of the logic read recovery system are thereby generated.

This system had the disadvantage of requiring a considerable number of integrated circuit elements to provide the read recovery of MFM digital signals. To these logic circuits were added a considerable number of integrated circuit elements to provide the read recovery of FM digital signals.

It should be understood that the references cited herein are those which the applicants are aware and are presented to acquaint the reader with the level of skill in the art and may not be the closest references to the invention. No representation is made that any search has been conducted by the applicants.

OBJECTS OF THE INVENTION

It is a primary object of the invention to provide a data processing system which includes a peripheral subsystem having improved data recovery apparatus.

It is an object of the invention to provide a peripheral subsystem with improved data recovery apparatus for processing data written in the MFM mode.

It is another object of the invention to provide a peripheral subsystem with improved data recovery apparatus for processing data written in the FM mode.

It is still another object of the invention to provide a peripheral subsystem with improved data recovery apparatus for processing data written in either the FM or MFM mode.

It is yet another object of the invention to provide a peripheral subsystem with improved data recovery apparatus having fewer components and lower cost than does the prior art.

It is yet another object of the invention to provide a peripheral subsystem with improved data recovery apparatus having increased reliability with improved ease of maintenance.

SUMMARY OF THE INVENTION

Information from the disk or diskette device represented by binary ONE signals indicating data or clock bits is received by the read recovery apparatus. A first binary ONE signal is applied to a shift register which is activated by a free-running clock signal.

A counter also activated by the free-running clock signal is preset to a predetermined count upon receiving a first predetermined shift register signal. When a second binary ONE signal is received by the read recovery apparatus and is applied to the shift register, a second predetermined shift register signal is applied to a register to store the output count of the counter. The output count of the counter is a measure of the time between the apparatus receiving the first and second binary ONE signals.

Means are provided for indicating whether the first binary ONE signal is a clock bit or a data bit. Means are also provided for indicating whether the data received is in an MFM or FM mode.

The output count signals of the counter, the last data signal and the mode signal are applied to the input address terminals of a Programmable Read Only Memory (PROM). The identified address location stores binary bits indicative of the data bits received, binary ONE's and binary ZERO's, thereby separating the clock information from the data information. The binary bits stored in PROM also indicate the number of cell positions received during the MFM mode and also indicate if the data received has a missing clock bit indicating an address mark byte.

Apparatus also includes means for counting a plurality of successive bytes, each containing eight data bits of binary ZERO.

A typical format in both FM and MFM modes comprises a plurality of bytes containing eight bits of binary ZERO's followed by a plurality of address mark bytes followed by a plurality of data bytes.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 1 is a block diagram of a typical system.

FIG. 2a shows typical clock and data bit configurations in the MFM and FM modes.

FIG. 2b shows address mark byte bit configurations in the MFM and FM modes.

FIG. 5 is a layout of the information stored in the PROM address locations for the MFM mode.

FIG. 6 is a layout of the information stored in the PROM address locating for the FM mode.

DESCRIPTION OF THE PREFERRED EMBODIMENT

Figure 3:
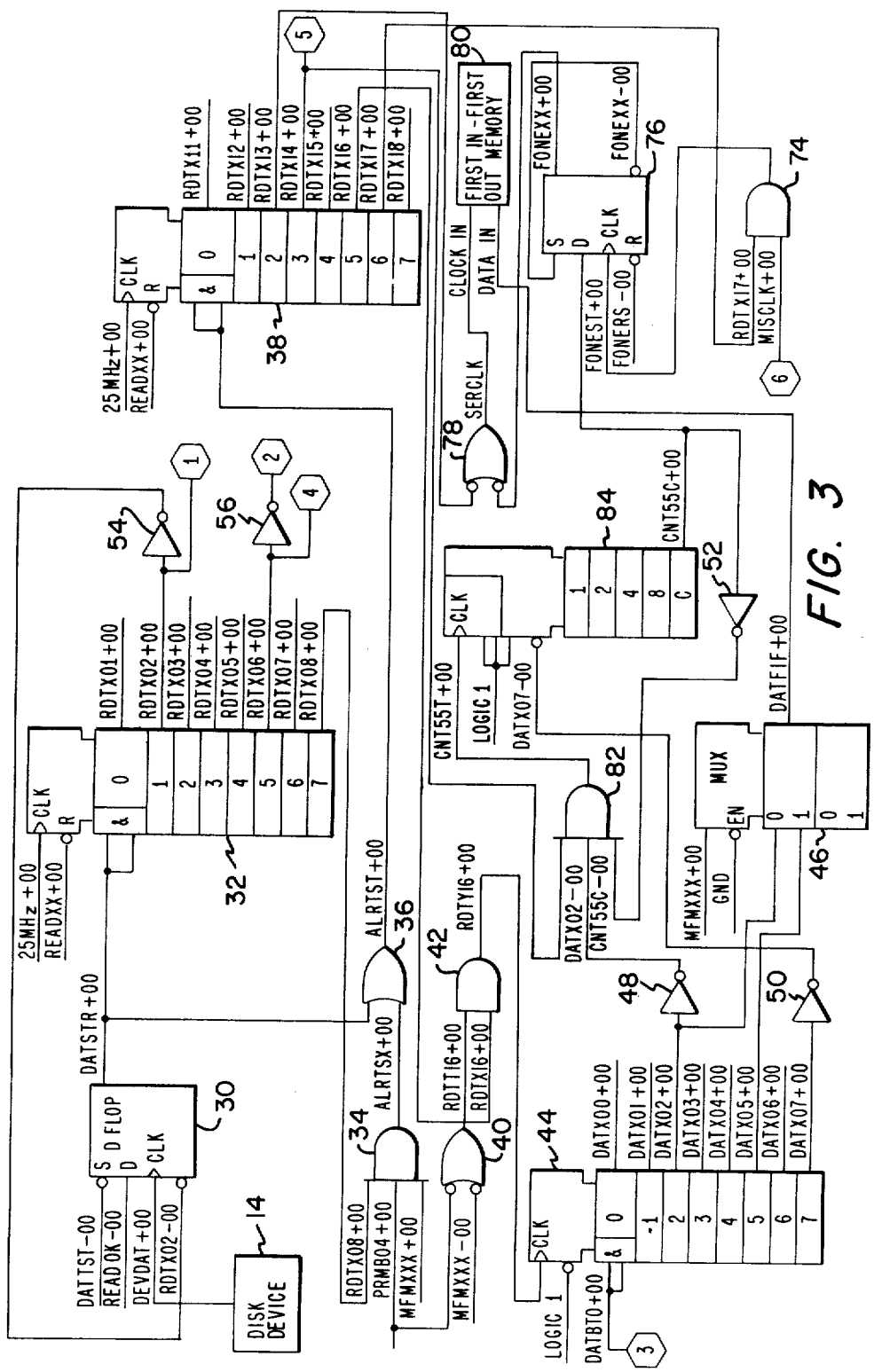
FIG. 3 is a detailed logic diagram of the preferred embodiment.
Figure 3:
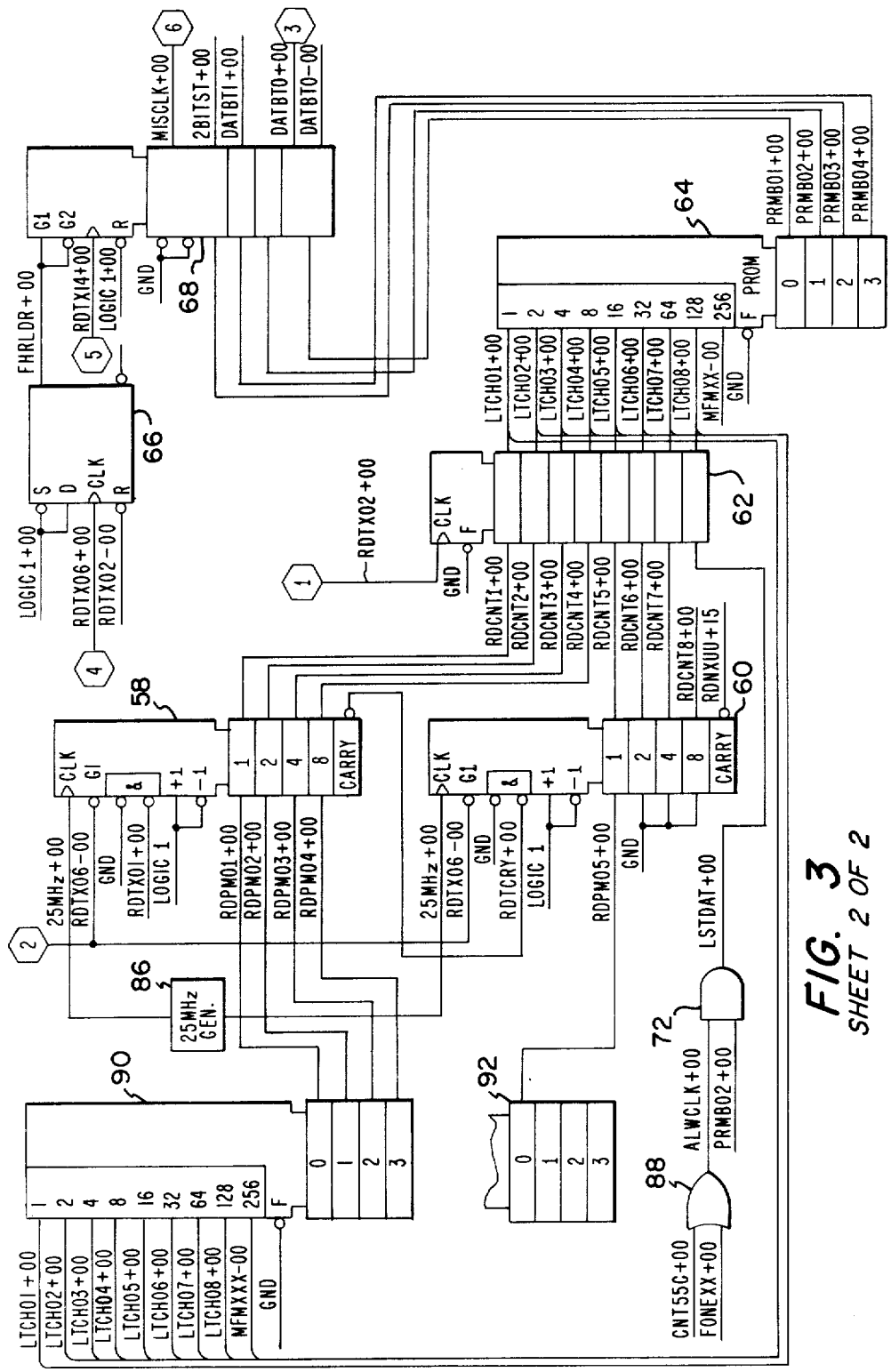

FIG. 1 shows a typical Honeywell Level 6 Minicomputer System comprising a memory 4, typical peripheral controllers 6, a mass storage controller 10 and a central processor 18; all coupled to a system bus 2. A disk adapter 12 is coupled to mass storage controller 10 and a plurality of disk devices 14 are coupled to the disk adapter 12.

FIG. 2a shows typical data streams made up of clock and data pulses. Data stream 20 is an example of frequency modulation recording (FM) and data stream 22 is an example of modified frequency modulation recording (MFM).

The solid lines indicate the actual wave shape of the data stream after the analog signals generated by the read head of the disk are digitized. The dotted lines indicate the timing positions of binary ZERO bits and clock bits that are not recorded on the media.

FIG. 2b shows data streams of an address mark byte 24 in an FM mode of recording and an address mark byte 26 in an MFM mode of recording.

The FM and MFM coding schemes as well as the address mark byte codes are described in the IBM document GA 21-9257-1 entitled: "IBM Two-Sided Diskette Original Equipment Manufacturers Information Second Edition (November 1977)"

Referring to FIG. 3, flux transitions representing clock pulses or data pulses on the surface of a recording media are sensed by a read head of disk device 14. The analog signal output of the head is digitized and sent to the disk adapter 12. Pulses representative of data and clock bits are applied to the clock input terminal of D-flop 30 which sets on the rise of the 200 nanosecond pulse if the signal READOK-00 input to the D terminal of flop 30 is at logical ONE. The output signal DATSTR+00 is applied to the AND input terminals of a shift register 32 and to the AND input terminals of a shift register 38 through an OR gate 36 via output signal ALRTST+00, and set into the ZERO position on the rise of the free-running 25MHZ+00 clock. The output RDTX02+00 of shift register 32 is forced to logical ONE on the next rise of the 25MHZ+00 clock and resets flop 30 through an inverter 54. Pulses are advanced through shift register 32 and 38 on successive rises of the 25MHZ+00 clock. When output signal RDTX06+00 is forced to logical ONE, the RDTX06-00 input signal to terminal G1 of counters 58 and 60 is forced to logical ZERO by an inverter 56, presetting the counters 58 and 60 to hexadecimal 10, since the output signal RDPM05+00 of a PROM 92 is at logical ONE, and the output signals RDPM01+00 through RDPM04+00 of a PROM 90 are at logical ZERO. The function of PROMs 90 and 94 are further described in the related U.S. applcation Ser. No. 038,977 entitled "Digital Read Recovery with Variable Frequency Compensation". The counters 58 and 60 start a new count on successive rises of the 25MHZ+00 clock.

The next data or clock pulse received over signal line DEVDAT+00 again sets flop 30 which applies the output signal DATSTR+00 to the ZERO position of shift registers 32 and 38 on the rise of the 25MHZ+00 clock. Output signal RDTX02+00 is forced to logical ONE on the next rise of the 25MHZ+00 clock and is applied to the clock input of a register 62. This sets the output of counters 58 and 60 into register 62 whose output signals LTCH01+00 through LTCH08+00 are applied to the input address terminals 1 through 128 respectively of a PROM 64. The binary number represented by the signals LTCH01+00 through LTCH07+00 is a measure of the time between successive input pulses received by flop 30 over signal line DEVDAT+00. Signal LTCH08+00 indicates whether the previous pulse over signal line DEVDAT+00 was a data or clock bit.

For the modified frequency modulation (MFM) mode, the output signals of the PROM 64 indicate the following:

| Signals PRMBXX+00 XX | | | | |
|---|---|---|---|---|
| 04 | 03 | 02 | 01 | |
| 1 | 1 | 0 | 0 | -04 at logical ONE indicates that two cells of information were received -03 at logical ONE indicates that the cells of information contain address marks (missing clock) -02 at logical ZERO indicates that the previous bit received was a clock bit and that the second data |

-continued

| Signals PRMBXX+00 XX | | | | |
|---|---|---|---|---|
| 04 | 03 | 02 | 01 | |
| | | | | bit is a binary ZERO -01 at logical ZERO indicates that the first data bit received is a binary ZERO |
| 0 | 0 | 0 | 0 | -04 at logical ZERO indicates that one cell of data was received -02 at logical ZERO indicates that the previous bit received was a clock bit -01 at logical ZERO indicates that the data bit in the cell is a "ZERO" |
| 0 | 0 | 1 | 1 | -04 at logical ZERO indicates that one cell of data was received -02 at logical ONE indicates that although the previous bit could be a data or clock bit, 01 at logical ONE indicates that the bit just received is a binary "ONE" |
| 1 | 0 | 0 | 0 | -04 at logical ONE indicates that two cells of information were received -02 at logical ZERO indicates that the bit in the second cell received is a "ZERO" -01 at logical ZERO indicates that the bit in the first cell received is a "ZERO" |
| 1 | 0 | 1 | 0 | -04 at logical ONE indicates that two cells were received -02 at logical ONE indicates that the bit in the second cell received is a "ONE" -01 at logical ZERO indicates that the bit in the first cell received is a "ZERO" |

Figure 4:
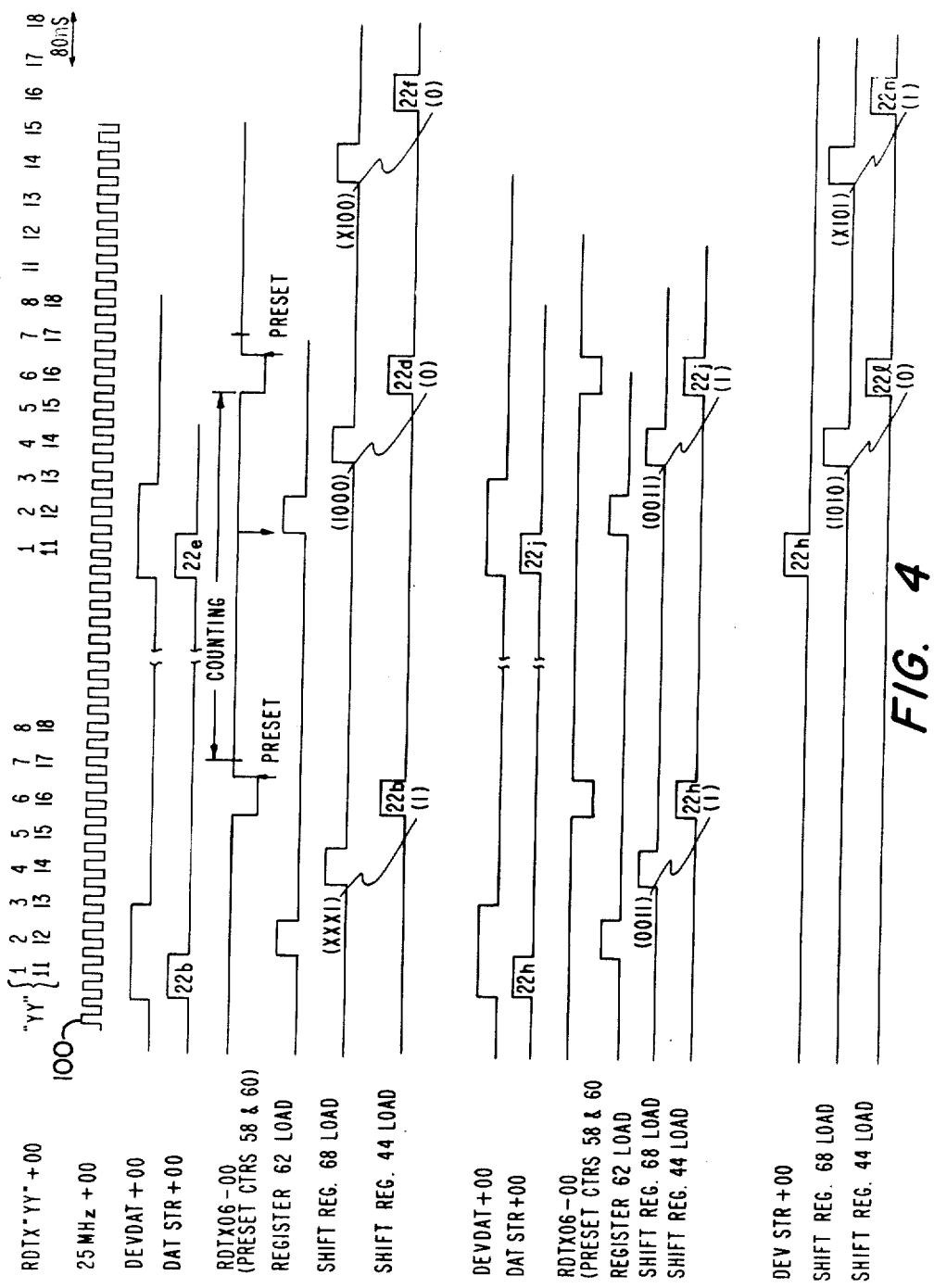
FIG. 4 is a timing diagram of the preferred embodiment.

Referring to the MFM timing signal 22, FIG. 2a in conjunction with the PROM pattern in FIG. 4, receiving pulse 22b over signal line DEVDAT+00 sets flop 30 thereby initiating simultaneous output pulses RDTX01+00 and RDTX11+00 from shift registers 32 and 38 respectively. Note that clock position 22a is at binary ZERO. The output pulses shift on successive rises of the 25MHZ+00 clock. Output pulse RDTX06−00 again presets counters 58 and 60 to hexadecimal 10. The counters 58 and 60 count 25MHZ+00 clock pulses until pulse 22e is received over signal line DEVDAT+00. Shift registers 32 and 38 again start shifting on successive rises of the 25MHZ+00 clock starting with output pulses RDTX01+00 and RDTX11+00. When output signal RDTX02+00 is forced to logical ONE, the output signals of counters 58 and 60 are stored in register 62, as is the LSTDAT+00 signal at logical ONE indicating that pulse 22b was a data bit. The output signals of register 62 select from PROM 64 one of the address locations between 200 through 222 FIG. 5 which select the output signals PRMB04+00 through PRMB01+00 as binary signals 1000 respectively, indicating that two cells were read, bit positions 22d and 22f are binary ZEROs and bit position 22e is a clock bit. Bit positions 22b and 22e are approximately 3 microseconds apart. In that time, counters 58 and 60 have counted 75 25MHZ+00 clock pulses. Since the counters were preset to hexadecimal 10 ($16_{10}$) after RDTX16−00 time and transferred to register 62 at RDTX02+00 time, the address location selected is 212. (75+16−7+128=212; 128 because the previous bit was a data bit and −7 as the difference between RDTX06−00 and RDTX02+00 time.) Bit position 22d signal DATBT0+00 at binary ZERO is stored in shift register 44 and shifted at RDTX16+00 time. Shift register 44 is advanced at RDTX16+00 time through a NOR gate 40 and an AND gate 42 since signal MFMXXX−00 is at logical ZERO, signal RDTT6+00 is at logical ONE. Shift register 44 advances on the rise of signal RDTY16+00. Shift register 68 is shifted at the next RDTX14+00 time and bit position 22f is stored in shift register 44 and shifted at the next RDTX16+00 time. This second cycle was generated by the output signal ALRTSX+00 of AND gate 34, forcing the RDTX11+00 output signal of shift register 38 to logical ONE through OR gate 36 which shifts through successive positions of shift register 38 on successive rises of the 25MHZ+00 clock.

Counters 58 and 60 are preset to hexadecimal 10 at RDTX06−00 time after pulse 22e is received. When pulse 22h is received, the output of counters 58 and 60 is again transferred to register 62. Since the previous pulse received was a clock pulse, signa LSTDAT+00 is at logical ZERO thereby selecting the lower half of PROM 64. In this case the output signals of register 62 select an address location in the range of 72 through 94 in PROM 64, thereby generating output signals PRMB04+00 through PRMB01+00 as binary signals 0011 respectively. The output signal DATBTO+00 at logical ONE is stored in shift register 44 and the output signal LSTDAT+00 is forced to logical ONE to indicate that the pulse 22h is a data bit.

Data pulse 22j results in binary signals 0011 being generated as the output of PROM 64 and a binary ONE being stored in shift register 44.

Data pulse 22n results in binary signals 1010 being generated as the output of PROM 64, resulting in two data bits 22l and 22n being stored in shift register 44 as described supra.

It is necessary to provide synchronization between the information received from the disk adapter 12 and the information to be sent out on system bus 2. Twelve bytes of ZEROs are written on the media track followed by three bytes of address marks. The address marks are characterized by a missing clock transition at the boundary between cells 4 and 5 of each address mark byte.

Shift register 44 stores the binary ZERO data bits received from the disk device 14. As the data bits shift through shift register 44, the number of successive binary ZEROs are counted by a counter 84. If the DATX02+00 output of shift register 44 is at logical ZERO, then it is applied through an inverter 48 to an input of an AND gate 82. At RDTX14+00 time, the output signal CNT55T+00 is applied to the clock terminal of a counter 84 which counts on the rise of the clock pulse. The counter 84 is reset by the signal DATX07+00 at logical ONE indicating that a binary ONE is applied to the reset terminal of counter 84 through an inverter 50. The output signal CNT55C+00 at logical ONE indicates that three bytes of binary ZEROs were received and prevents counter 84 from advancing by conditioning the output of AND gate 82 through an inverter 52 to logical ZERO. Two bytes of binary ZEROs are indicated by the counter 84 and the third byte of binary ZEROs is stored in the shift register 44.

When the first address mark byte is received with the missing clock pulse, PROM 64 provides a 1100 binary output indicating that two information cells were received with a missing clock bit. The output of shift register 68, signal MISCLK+00; is applied to an input of an AND gate 74 which at RDTX17+00 time applies an output signal FONEST+00 to the clock input terminal of a D-flop 76 thereby setting flop 76 on the rise of the clock signal. The output signal FONEXX—00 at logical ZERO keeps the flop 76 set. The output signal FONEXX+00 at logical ONE enables a NOR gate 78 to apply RDTX13+00 timing signals to a First In-First Out memory 80 thereby enabling the storing of data signals from output signal DATFIF+00 of a MUX46.

Either of the input signals CNT55C+00 or FONEXX+00 applied to an OR gate at logical ONE forces the allow clock output signal ALWCLK+00 to logical ONE. If the PROM 64 output signal PRMB02+00 is at logical ONE, the output of an AND gate 72, signal LSTDAT+00 at logical ONE, is stored.

In the FM mode, the upper half of the memory locations of PROM 64 are addressed since the signal MFMXX—00, applied to the address input terminal decimal 256; is at logical ONE.

For the frequency modulation (FM) mode, the output signals of the PROM 64 indicate the following:

| Signals PRMBXX+00 XX | | | | |
|---|---|---|---|---|
| 04 | 03 | 02 | 01 | |
| 0 | 0 | 1 | 1 | -04 at binary ZERO indentifies the cell as having a data bit<br>-02 at binary ONE identifies the previous bit as a clock bit<br>-01 at binary ONE identifies the data bit as a binary ONE |
| 0 | 0 | 0 | 0 | -04 at binary ZERO identifies the cell as having a data bit<br>-01 at binary ZERO identifies the data bit as a binary ZERO |
| 1 | 0 | 0 | 0 | -04 at binary ONE indicates no data bit in this half cell |
| 0 | 1 | 1 | 1 | -03 at binary ONE identifies the byte as an address mark having a missing clock<br>-02 at binary ONE identifies the previous bit received as a binary ONE<br>-01 at binary ONE identifies this data bit received as a binary ONE |

In the FM mode, signal PRMB04+00 at logical ONE, applied to NOR gate 40, forces the output signal RDTT16+00 to logical ZERO thereby suppressing the clock input to shift register 44 when writing the address mark. Also in the FM mode, the 0 input terminal of MUX46 is enabled allowing the DATX02+00 signal to shift data information to FIFO80.

FIG. 4 is a timing diagram of the logic of FIG. 3 processing the data stream 22 of FIG. 2a.

The free-running clock 25MHZ+00 100 has a 40 nanosecond cycle time. Data is received as a 200 nanosecond pulse DEVDAT+00 102 which sets flop 30 and signal DATSTR+00 starts a shift registers 32 and 38 cycle. This is shown as the RDTX"YY"+00 114 timing of 80 nanoseconds per cycle by means of signals RDTX01+00 through RDTX08+00 and RDTX11+00 through RDTX18+00.

In a typical operation, pulse 22b is received over DATSTR+00. The counters 58 and 60 are preset by timing signal RDTX06—00 106 to hexadecimal 10 and the counters advance on the rise of successive 25MHX clock cycles. Three nanoseconds later, pulse 22e appears on signal line DATSTR+00 which causes the count in counters 58 and 60 to be loaded into register 62. The output of register 62 is applied to the address input of PROM 64 resulting in the binary signal 1000 readout, indicating that two cells of information were received, and loaded into shift register 68. The low order bit of binary 1000 is transferred to shift register 44 as binary 0 (bit 22d). Binary 1000 is shifted on position to the right binary X100 and again the lower order bit; in this case a binary ZERO is transferred to shift register 44 as binary 0 (bit 22f).

Note, in the case of the PROM output being binary 1010, the low order binary ZERO indicates that bit position 221 is a binary ZERO. Shifting binary 1010 to binary X101 in shift register 68 results in the low order position having a binary ONE. This is transferred to shift register 44 as a binary ONE (22n).

FIG. 5 shows the bit configuration of the lower half of the PROM 64 for the MFM mode. The rule for establishing the MFM coding scheme is:

1. A cell contains a clock position followed by a data position and is two microseconds in duration.
2. If a cell contains a binary ONE data bit, it does not contain a clock bit.
3. If a cell does not have a binary ONE data bit and the previous cell has a binary ONE data bit, then the cell has no clock bit. If the previous cell has a binary ZERO, then the cell has a clock bit.

Therefore in the MFM mode if the previous bit was a clock bit, then the next bit sensed occurs in either two or three microseconds. If the next bit occurs in four microseconds, it indicates that the missing clock position of the address mark was read.

If the previous bit was a binary ONE data bit, then the next bit will be sensed in two, three or four microseconds.

Referring to FIG. 6, the FM mode has a clock bit in every cell. A cell is four microseconds long. No pulse is received for a binary ZERO.

If a clock bit is sensed, then the next bit sensed is either a binary ONE in two microseconds or the next clock pulse in four microseconds. If a binary ONE bit is sensed, then the next clock bit sensed in four microseconds indicates the data as an address mark byte.

| Logic Circuits in the Preferred Embodiment | |
|---|---|
| Flop 30 | 74S74 |
| 66 | 74S74 |
| 76 | 74L74 |
| Shift Register 32, 38 | 74S164 |
| 68 | 74S195 |
| Counters 58, 60 | 74LS169 |
| 84 | 74LS161 |
| Register 62 | 74LS374 |
| MUX 46 | 74LS157 |

The above circuits are described in "The TTL Data Book for Design Engineers", Second Edition, published by Texas Instruments Inc., copyright 1976.

PROMs 64, 90, 92 93446

The above PROMs are described in the "Bipolar Memory Databook", published in 1977 by the Fairchild Corporation, 464 Ellis St., Mountainview, Calif. 94042.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same results and fall within the spirit of the claimed invention. It is the intention, therefore, to limit the invention only as indicated by the scope of the claims.

What is claimed is:

1. A data recovery system for converting an information stream of clock signals and data signals received from a device in a plurality of modes into decoded data signals representative of a plurality of synchronization bytes and a plurality of address mark bytes to synchronize said information stream received from said device, and a plurality of data field bytes comprising:

interval timing means for receiving said information stream and including first shifting means for generating a plurality of shift timing signals and counting means responsive to said plurality of shift timing signals for generating interval timing signals indicative of the time between successive information signals of said information stream at a predetermined logic level;

read only memory means coupled to said interval timing means and responsive to said plurality of shift timing signals and said interval timing signals for generating a sequence of a plurality of data status signals indicative of said decoded data signals and a missing clock signal; and data interpretation means coupled to said interval timing means and to said read only memory means and including zero byte counting means responsive to said plurality of shift timing signals and to said sequence of said plurality of data status signals for generating a zero byte output signal when said decoded data signals are representative of one of said plurality of synchronization bytes, and further including data field recognition means responsive to said zero byte output signal, said plurality of shift signals and said sequence of said plurality of data status signals including said missing clock signal for generating a serial clock signal indicative of said information stream including a predetermined number of synchronization bytes, and address mark bytes and that the following bytes of said information stream are representative of said plurality of data field bytes.

2. The system of claim 1 wherein said interval timing means comprises:

free running clock means for generating a clock pulse;

receiving means for storing each of said information bits at said predetermined logic level and generating an output data signal;

first said shifting means coupled to said receiving means and said free running clock means and responsive to said output data signal for generating said plurality of shift timing signals in accordance with said clock pulses;

said counting means coupled to said first shifting means and said free running clock means, being initialized by a first shift timing signal and responsive to said clock pulses for generating said interval timing signals.

3. The system of claim 2 wherein said read only memory means comrises:

register means coupled to said counting means and said first shifting means for storing said interval timing signals in response to a second shift timing signal, thereby generating a plurality of latch signals;

read only memory means coupled to said register means and responsive to said latch signals for selecting an address location of said read only memory means, said address location storing bits representative of a plurality of binary signals; and second shifting means coupled to said read only memory means and said first shifting means for storing said binary signals in response to a third shift timing signal thereby generating a first and a second of said plurality of data status signals.

4. The system of claim 3 wherein said data interpretation means comprises:

third shifting means coupled to said second shifting means and to said first shifting means for storing and shifting said second of said plurality of data status signals indicative of said decoded data signals in response to a fourth shift timing signal thereby generating a plurality of data shift signals;

said zero byte counting means coupled to said first shifting means and said third shifting means, being responsive to a first data shift signal at logical ZERO for counting said third shift timing signal, and being responsive to a second data shift signal for initializing said zero byte counting means, said zero byte counting said generating said zero byte output signal when receiving said first data shift signal at logical ZERO for a predetermined number of said third shift timing signals; and data field recognition means coupled to said zero byte counting means and to said second shifting means, being conditioned by said zero byte output signal, being set by said first of said plurality of data status signals indicative of said missing clock signal, thereby generating a serial clock signal indicating that said system receiving a predetermined number of bytes containing all zero data bits and said plurality of address mark bytes and that the next information is said plurality of data field bytes.

5. The system of claim 4 wherein said read only memory means further comprises:

last data means coupled to said read only means, said zero byte counting means and said data field recognition means and responsive to a first binary signal, said zero byte output signal and said serial clock signal for generating a last data signal for application to said register means for generating a first latch signal of said plurality of latch signals.

6. The system of claim 5 wherein said plurality of modes includes a frequency modulation mode (FM) and a modified frequency modulation mode (MFM).

* * * * *